(12) United States Patent
Huang et al.

(10) Patent No.: US 8,929,597 B2
(45) Date of Patent: Jan. 6, 2015

(54) METHOD OF TRACKING OBJECTS

(75) Inventors: Yea-Shuan Huang, Hsinchu (TW); Yu-Chung Chen, Hsinchu (TW)

(73) Assignee: Chung Hua University, Hsinchu (TW)

( * ) Notice: Subject to any disclaimer, the term of this patent is extended or adjusted under 35 U.S.C. 154(b) by 89 days.

(21) Appl. No.: 13/527,429

(22) Filed: Jun. 19, 2012

(65) Prior Publication Data

US 2013/0259302 A1 Oct. 3, 2013

(30) Foreign Application Priority Data

Apr. 3, 2012 (TW) .............................. 101111784 A

(51) Int. Cl.
*G06K 9/00* (2006.01)
(52) U.S. Cl.
USPC ........................................................ 382/103
(58) Field of Classification Search
USPC ........................................................ 382/103
See application file for complete search history.

(56) References Cited

U.S. PATENT DOCUMENTS

| | | | | |
|---|---|---|---|---|
| 8,019,143 | B2 * | 9/2011 | Kanda ............................ | 382/133 |
| 8,111,873 | B2 * | 2/2012 | Berthilsson et al. ........... | 382/103 |
| 8,270,675 | B2 * | 9/2012 | Senior ............................ | 382/103 |
| 8,559,670 | B2 * | 10/2013 | Wang et al. .................... | 382/103 |
| 2008/0187173 | A1 * | 8/2008 | Kim et al. ...................... | 382/103 |
| 2008/0240496 | A1 * | 10/2008 | Senior ............................ | 382/103 |
| 2012/0093364 | A1 * | 4/2012 | Sato ............................... | 382/103 |
| 2012/0183177 | A1 * | 7/2012 | Ku et al. ........................ | 382/103 |
| 2012/0274785 | A1 * | 11/2012 | Takeuchi et al. .............. | 348/169 |
| 2013/0195361 | A1 * | 8/2013 | Deng et al. .................... | 382/195 |

OTHER PUBLICATIONS

Armanfard, N.; Komeili, M.; Valizadeh, M.; Kabir, E., "Effective hierarchical background modeling and foreground detection in surveillance systems," Computer Conference, 2009. CSICC 2009. 14th International CSI , vol., No., pp. 164,169, Oct. 20-21, 2009.*

* cited by examiner

*Primary Examiner* — Utpal Shah
(74) *Attorney, Agent, or Firm* — Chun-Ming Shih

(57) ABSTRACT

A method of object tracking is provided with creating areas of a tracking object and a non-tracking object respectively; determining a state of the tracking object and the non-tracking object is separation, proximity, or overlap; creating at least one separation template image of a separation area of the tracking object and/or the non-tracking object if the tracking object is proximate the non-tracking object; fetching all feature points of an overlapping area of the tracking object and the non-tracking object if the tracking object and the non-tracking object overlap; performing a match on each of the feature points and the separation template image so as to calculate a corresponding matching error score respectively; and comparing the matching error score of each feature point with that of the separation template image so as to determine whether the feature points belong to the tracking object or the non-tracking object.

7 Claims, 6 Drawing Sheets

METHOD OF TRACKING OBJECTS

BACKGROUND OF THE INVENTION

1. Field of the Invention

The invention relates to tracking objects and more particularly to a method of tracking a tracking object and a non-tracking object for identification even when overlap occurs.

2. Description of Related Art

Conventionally, an original image is converted into a binary image having either a value of 1 (i.e., image of interest) or value of 0 (i.e., image of don't care) based on features such as skin color of an object or view distance or calculation (e.g., background addition or subtraction) in object tracking. This has the benefits of sharp contrast and reliability.

Positions and ranges of different objects in the binary image can be obtained by analyzing connected elements of the binary image. The relative positioning is critical to the effectiveness of tracking. Tracking is easy when two objects are spaced. However, tracking may be very difficult or even fail due to overlapping.

Thus, distance state of two objects is thus very important. There are three states, i.e., separation, proximity and overlap between any two objects of interest. An object to be tracked is first taken as an object of interest. Next, a state of the object with respect to another object is determined by detection.

It is defined that separation means there is a great distance (i.e., greater than a predetermined distance) between a tracking object and a non-tracking object, proximity means the distance between the tracking object and the non-tracking object is less than the predetermined distance, and overlap means the tracking object extends over and partly cover the non-tracking object to formed a connected object. The overlap can make object tracking more difficult and even cause failure.

The invention discussed later aims to increase the effectiveness of two overlapping objects.

SUMMARY OF THE INVENTION

It is therefore one object of the invention to provide a method of object tracking comprising creating areas of a tracking object and a non-tracking object respectively; determining a state of the tracking object and the non-tracking object is separation, proximity, or overlap; creating at least one separation template image of a separation area of at least one of the tracking object and the non-tracking object if the tracking object is proximate the non-tracking object; fetching all feature points of an overlapping area of the tracking object and the non-tracking object if the tracking object and the non-tracking object overlap; performing a match-on each of the feature points and the separation template image so as to calculate a corresponding matching error score respectively; and comparing the matching error score of each of the feature points with that of the separation template image so as to determine whether the feature points belong to the tracking object or the non-tracking object.

The above and other objects, features and advantages of the invention will become apparent from the following detailed description taken with the accompanying drawings.

DETAILED DESCRIPTION OF THE INVENTION

Figure 1:
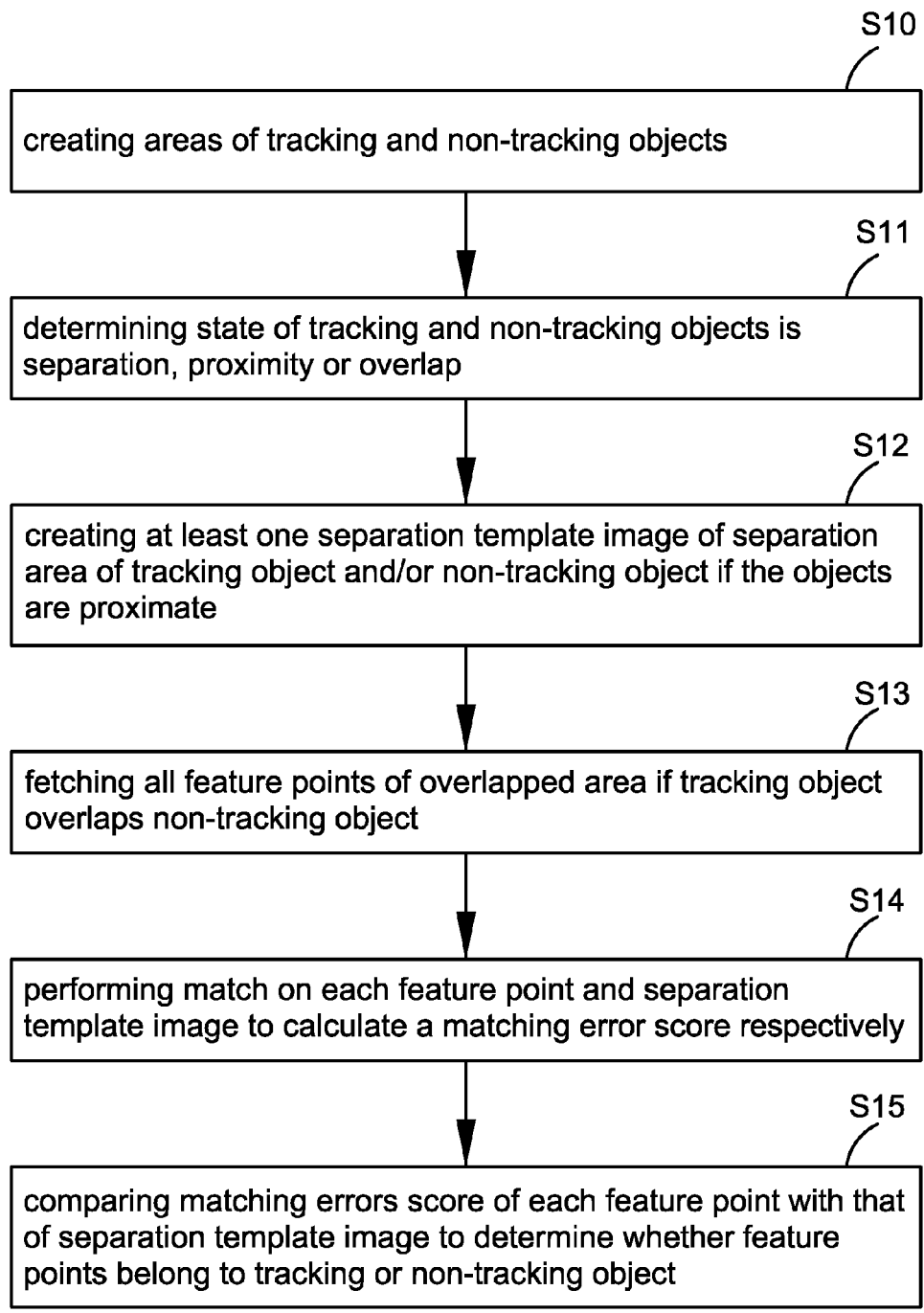
FIG. 1 is a flow chart of a method of object tracking according to a first preferred embodiment of the invention.

Referring to FIGS. 1 to 4, a flow chart diagram of a method of object tracking in accordance with the invention is illustrated. A computer (e.g., personal computer, laptop, or the like) is employed to execute the method. The method comprises the following steps as discussed in detail below.

Step S10: Areas of a tracking object and a non-tracking object are created respectively.

Step S11: State such as separation, proximity, or overlap of the tracking object and the non-tracking object is determined.

Step S12: At least one separation template image of a separation area of at least one of the tracking object and the non-tracking object is created if the tracking object is proximate the non-tracking object.

Step S13: All feature points of an overlapping area of the tracking object and the non-tracking object are fetched if the tracking object and the non-tracking object overlap.

Step S14: A matching is performed on each of the feature points and the separation template image so as to calculate a corresponding matching error score respectively.

Step S15: The matching error score of each of the feature points and that of the separation template image are compared with each other so as to determine whether the feature points belong to the tracking object or the non-tracking object.

Each of the tracking object and the non-tracking object has a respective area which can be any shapes including rectangle (as exemplary example discussed below). The area has a width w, a height h, and a coordinate (x, y) on the left top portion. For an area R of step S10, R.x, R.y, R.w and R.h represent the four items, a $R_t^i$ represents the rectangular area of the i-th object at time t, $Q_t$ represents the rectangular area of the tracking object at time t, and $C_t$ represents the rectangular area of the non-tracking object at time t.

An overlapping ratio $B_t$ of the rectangular area $R_t$ of the i-th object and the rectangular area $Q_{t-1}$ of the tracking object at time (t−1) is calculated one by one in the tracking. Area($Q_{t-1}$) is the rectangular area of the tracking object at time (t−1). Area($R_t^i$) is the rectangular area of the i-th object at time t. $X_{left}$, $X_{right}$, $Y_{top}$ and $Y_{bottom}$ are the left, the top, the right and the bottom values of the overlapped rectangle of the i-th object and the tracking object at time (t−1) as expressed below.

$$X_{left}=\max(Q_{t-1}.x, R_t^i.x)$$

$$Y_{top}=\max(Q_{t-1}.y, R_t^i.y)$$

$$X_{right}=\min(Q_{t-1}.x+Q_{t-1}.w, R_t^i.x+R_t^i.w)$$

$$Y_{bottom}=\min(Q_{t-1}.y+Q_{t-1}.h, R_t^i.y+R_t^i.h)$$

The overlapped rectangle is empty if $X_{left}>X_{right}$ or $Y_{top}>Y_{bottom}$. That is, the overlapped rectangle does not exist and there is no common element for $R_t^i$ and $Q_{t-1}$. $B_t$ can be obtained by the following expression if $R_t^i$ overlaps at $Q_{t-1}$ $$B_t = \frac{(X_{right} - X_{left}) \times (Y_{bottom} - Y_{top})}{\max(\text{Area}(R_t^i), \text{Area}(O_{t-1}))}$$

i* is chosen as the current tracking object from all objects since it has the largest overlapped area and is expressed below.

$$i^* = \underset{t}{\arg\max} B_t$$

Thereafter, a rectangular area of the tracking object at time t is created by the rectangular area of the i*-th object, that is, $Q_t = R_t^{i^*}$. Further, the rectangular area of each non-i* object can be taken as the rectangular area $C_t$ of the non-tracking object.

The step S10 further comprises the following sub-steps:

Sub-step S100: A corresponding area of each of a plurality of objects in an image is created in which the area has a width w, a height h, and a coordinate (x, y) on the left top portion all associated with the corresponding object.

Sub-step S101: At least one tracking object is selected from the objects.

Sub-step S102: A first area of each tracking object at a first time (i.e., time (t−1)) is calculated and a second area of all objects in the image at a second time (i.e., time t) is calculated.

Sub-step S103: Extent of second area overlapping the first area is determined in order to obtain an overlapped ratio.

Sub-step S104: The object having the highest overlapped ratio in the second areas is taken as a tracking object.

Figure 2:
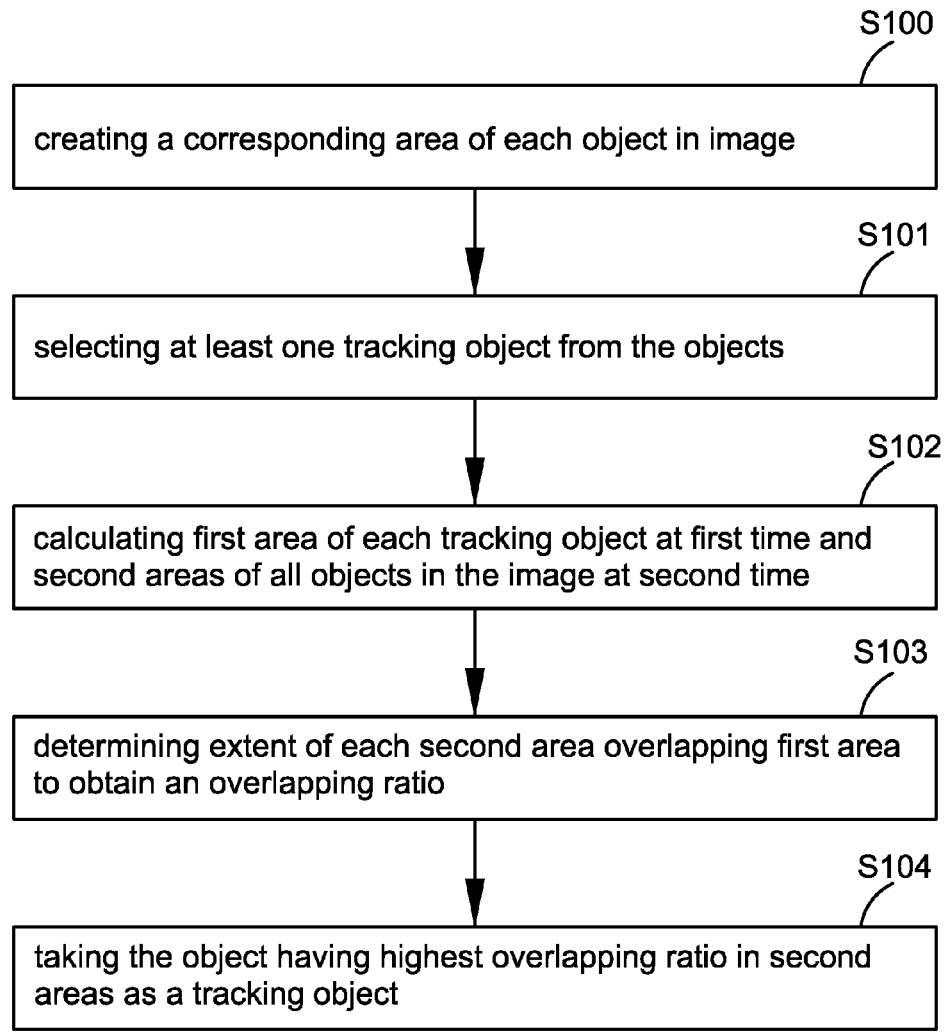
FIG. 2 is a flow chart of the sub-steps of the step S10.

As shown in FIG. 2, the computer facing a plurality of objects of the image may find the object having the highest overlapped ratio by matching at time t and time (t−1). In short, the computer may perform steps S100 to S104 with respect to each object in the tracking. Those objects having a lower overlapped ratio are taken as non-tracking objects.

Figure 3:
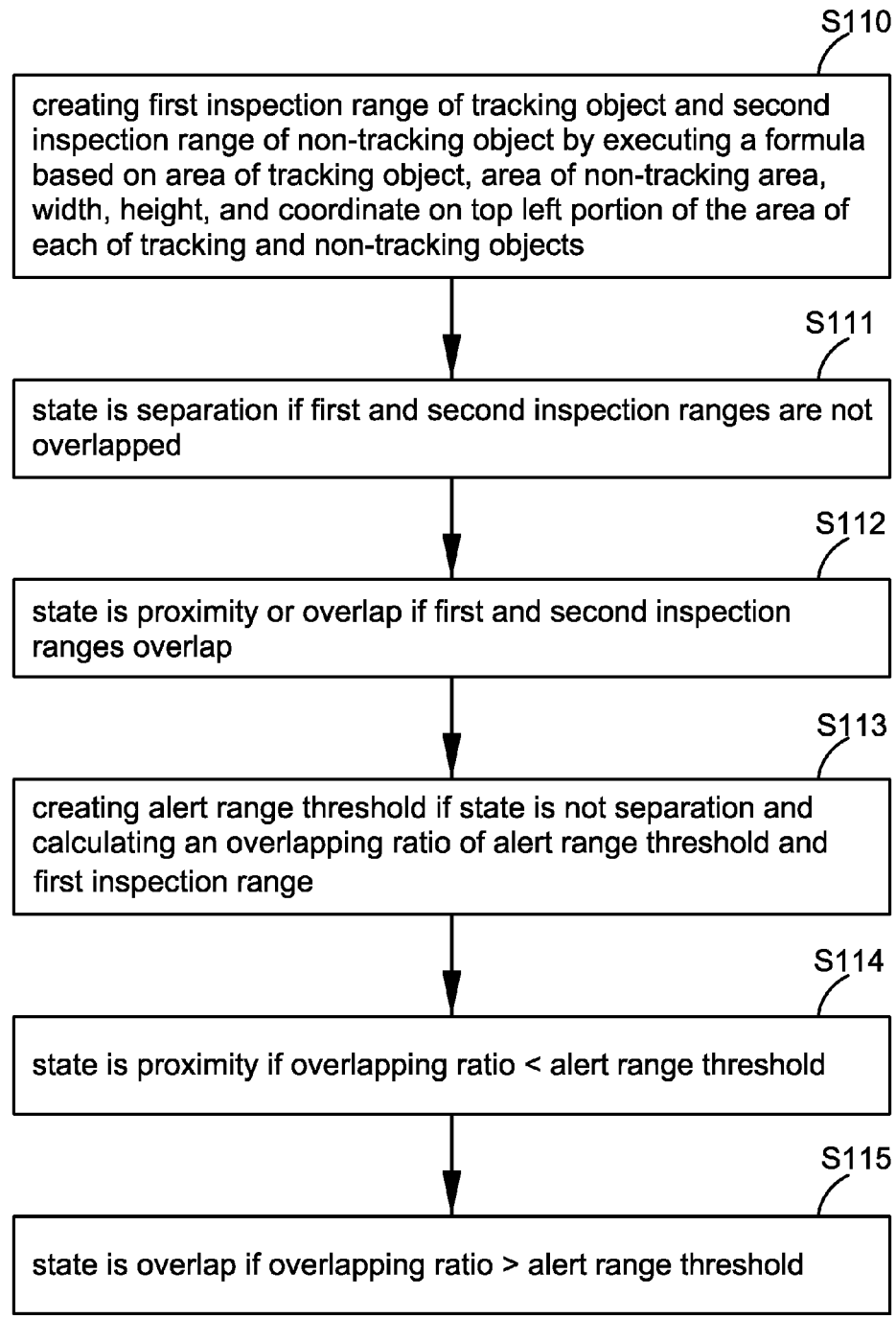
FIG. 3 is a flow chart of the sub-steps of the step S11.

As shown in FIG. 3, the computer may perform step S11 after clearly defining the tracking object and the non-tracking objects. Next, an inspection range $D_t^i$ is created based on the size of the area of object $R_t^i$ so that proximity of two objects can be determined. The step S11 further comprises the following sub-steps:

Sub-step S110: A first inspection range of the tracking object and a second inspection range of the non-tracking object are created by executing a predetermined formula based on area of the tracking object, area of the non-tracking object, width w, height h, and coordinate (x, y) on the left top portion of the area of the tracking object, and width w, height h, and coordinate (x, y) on the left top portion of the area of the non-tracking object.

Sub-step S111: State is determined to be separation if the first inspection range does not overlap the second inspection range.

Sub-step S112: State is determined to be proximity or overlap if the first inspection range overlaps the second inspection range.

Sub-step S113: An alert range threshold is created if the state is determined to be proximity or overlap and an overlapping ratio of the alert range threshold and the first inspection range is calculated.

Sub-step S114: State is determined to be proximate if the overlapping ratio is less than an alert range threshold.

Sub-step S115: State is determined to be overlap if the overlapping ratio is greater than the alert range threshold.

The predetermined formula is expressed below.

$$D_t^i = \left( R_t^i \cdot x - \frac{R_t^i \cdot w}{2},\ R_t^i \cdot y - \frac{R_t^i \cdot h}{2},\ 2 \times R_t^i \cdot w,\ 2 \times R_t^i h \right)$$

It is possible of determining state of an object by determining whether the inspection range $D_t^{i^*}$ of the tracking object overlaps the inspection range $D_t^i$ of the non-tracking object after creating the inspection ranges.

Non-overlapping discussed in sub-step S111 and overlapping discussed in sub-step S112 are determined using the overlapped ratio of sub-step S103. In short, state of the tracking object and the non-tracking object is either proximity or overlap if the overlapped ratio is greater than zero and state of the tracking object and the non-tracking object is separation if the overlapped ratio is equal to zero.

Figure 4:
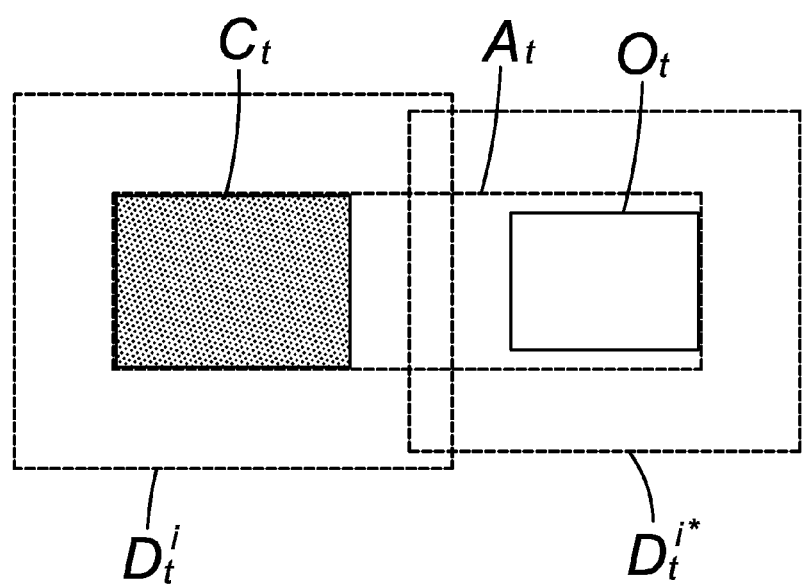
FIG. 4 schematically depicts two objects being overlapped.

As shown in FIG. 4, alert range threshold $A_t$ of sub-step S113 is employed to record a whole range of the rectangular area $Q_t$ of the tracking object and the rectangular area $C_t$ of a non-tracking object at time t when both objects are in the state of proximity as expressed below.

$A_{left} = \min(Q_t.x, C_t.x)$ $A_{top} = \min(Q_t.y, C_t.y)$ $A_{right} = \max(Q_t.x + Q_t.w, C_t.x + C_t.w)$ $A_{right} = \max(Q_t.y + Q_t.h, C_t.y + C_t.h)$ where $A_{left}$, $A_{top}$, $A_{right}$ and $A_{bottom}$ are the left, the top, the right and the bottom coordinates of the alert range threshold respectively. Thus, the rectangular are of the alert range threshold $A_t$ can be expressed as ($A_{left}$, $A_{top}$, $A_{right} - A_{left}$, $A_{bottom} - A_{top}$). Alert range threshold may vary as state changes and ranges recorded may also vary as the state changes. No alert is necessary for both objects if the state changes from proximity to separation. An overlapping object is created if a tracking object $Q_{t-1}$ at time (t−1) overlaps a non-tracking object $C_{t-1}$ at time t−1 when the state changes from proximity to overlap. The overlapping ratio of the overlapping object and the tracking object $Q_{t-1}$ at a previous time (t−1) is high in the state of overlap. Thus, the overlapping object is chosen as a tracking object of the current time. Further, the rectangular area of the tracking object is recorded as $Q_t$ and the alert range threshold is recorded as $A_t$.

In one embodiment, the alert range threshold is 0.7. Basically, the alert range threshold is between 0.01 and 0.9 by adjusting the area of the object and the alert range threshold.

As discussed in steps S12, S13, state of the tracking object and the non-tracking object is proximity. Thus, the computer may create at least one separation template image of a separation area of at least one of the tracking object and the non-tracking object. The separation area is a set of the area of the tracking object or the area of the non-tracking object. The separation template image comprises feature points of the non-tracking object and/or the tracking object in the separation area.

Following will discuss how to create a separation template image of the non-tracking object in a separation area. But it is still possible of creating a separation template image of a separation area of the tracking object in the state of proximity. Alternatively, a separation template image of a separation area of the tracking object and a separation template image of a separation area of the non-tracking object are created respectively. Further, at least one separation template image is taken as target for comparing feature points fetched in the state of overlap. These are techniques known in the art and are not discussed in detail for the sake of brevity.

The state of the tracking object and the non-tracking object is proximity. Creation of a separation template image of a separation area of the non-tracking object is taken as an exemplary example. How to fetch feature points and its comparison will be discussed in detail below.

The computer may fetch all feature points of the object overlapped by the tracking object and the non-tracking object when the state changes from proximity to overlap. The feature point fetch can be performed using a local binary pattern (LBP), a scale-invariant feature transform (SIFT), a speeded up Robost features (SURF), or any other vertex detection algorithm.

In one embodiment, LBP is taken by the invention for performing the feature point fetch in step S13. Further, sum of squared difference (SSD) is employed to perform block matching for feature point matching in step S14. Above is discussed in detail below.

The system will fetch feature points from the rectangular area of the overlapping object when the tracking object is in the overlap state. All fetched feature points are employed in the separation template created by the non-tracking object for block matching in the state of proximity. As a result, the best matched locations of the fetched feature points in the separation template can be computed by block matching. It is understood that block matching is a well method for similarity comparison. Sum of squared distance (SSD) is employed to perform the block matching in the following example:

A plurality of (e.g., n) feature points are fetched from the current image $I_t$. Next, map each feature point $f_t=(x,y)$, $1<t\leq n$ to a location on the matched image $I_*$ recorded by the separation template and give a displacement vector $(u, v)$ thereto. A deviation is calculated on the position $p_t=(x+u, y+v)$ in which $p_t$ is located in the separation range $R_*$ and the deviation is calculated by executing a formula below.

$$SSD_{(x,y)}(u, v) = \sum_{j=-B}^{B} \sum_{i=-B}^{B} (I_t(x+i, y+j) - I_*(x+u+i, y+v+j))^2$$

where B is the radius of a block centered on the feature point $f_i$. The smaller of the SSD the more similar between corresponding locations is. To the contrary, the larger of the SSD the less similar between corresponding locations is. Each feature point $f_i$ will find a displacement $(u^m, v^m)$ having a minimum deviation on the separation template as below.

$$(u^*, v^*) = \min_{(x+u, y+v) \in R*} SSD_{(x,y)}(u, v)$$

After finding $(u^m, v^m)$, an optimum matching position $P_t^m = (x+u^m, y+v^m)$ is obtained. Also, deviation $SSD_{(x,y)}(u^m, v^m)$ can be taken as feature point classification. SSD deviation is low when the feature point is the feature point of the non-tracking object. This is because the recorded separation template takes the non-tracking object before overlapping as record target. To the contrary, SSD deviation is high when the feature point is the feature point of the tracking object. This is because there is no information regarding tracking object record in the separation range $R_m$. Therefore, SSD deviation is defined as matching error score.

As discussed in steps S14 and S15, a feature point $f_i$ is classified based on the predetermined threshold $T_D$. $D_{fi}$ is defined as the matching error score of the i-th feature point $f_i$, i.e. $D_{fi}=SSD_{(x,y)}(x+u^*, y+v^*)$. The corresponding feature point is a feature point of the non-tracking object when $D_{fi}$ is less than the threshold $T_D$. The corresponding feature point is a feature point of the tracking object when $D_{fi}$ is greater than the threshold $T_D$. Thus, it is possible of correctly locating the feature points of both the tracking object and the non-tracking object when objects overlap. As a result, the purpose of identifying objects can be obtained.

Likewise, a separation template image of a separation area of the tracking object is created in the state of proximity. Next, a matching comparison is conducted in the state of overlap. The corresponding feature point is a feature point of the tracking object when $D_{fi}$ is less than the threshold $T_D$. The corresponding feature point is a feature point of the non-tracking object when $D_{fi}$ is greater than the threshold $T_D$.

Moreover, a separation template image of a separation area of each of the tracking object and the non-tracking object is created in the state of proximity. Next, a matching comparison is conducted in the state of overlap. As such, two matching error scores are obtained and each is compared with the threshold. Also, the two matching error scores are compared with each other. As a result, the matching comparison accuracy is greatly increased.

Figure 5:
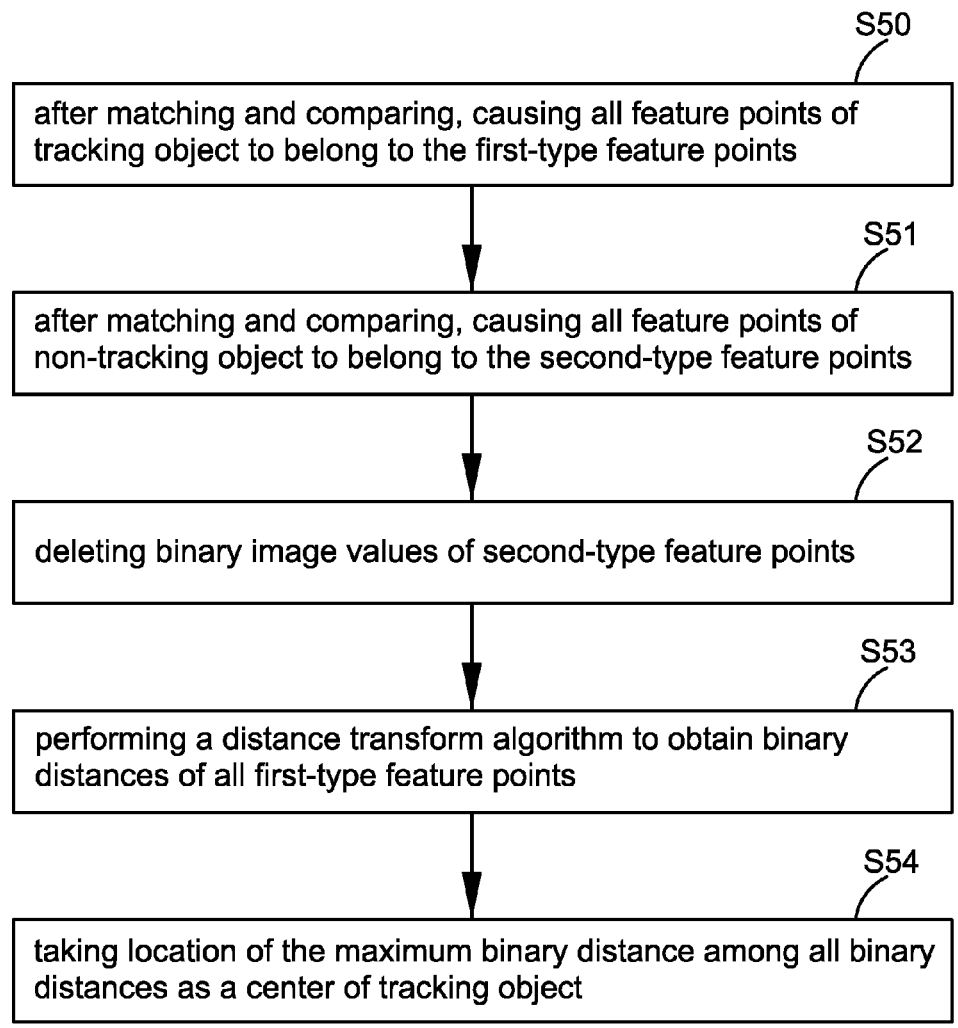
FIG. 5 is a flow chart of a method of object tracking according to a second preferred embodiment of the invention.

Referring to FIG. 5, a flow chart illustrates a method of a second preferred embodiment of the invention. The second preferred embodiment aims at successfully tracking a tracking object when the tracking object and a non-tracking object having similar features are in the state of overlap. The method of the second preferred embodiment comprises the following steps:

Step S50: After matching and comparing, it is determined that all feature points of the tracking object belong to the first-type feature points.

Step S51: After matching and comparing, it is determined that all feature points of the non-tracking object belong to the second-type feature points.

Step S52: Binary image values of the second-type feature points are deleted. For example, binary values of the second-type feature points are changed from one to zero so that a binary structure of the non-tracking object can be destroyed.

Step S53: A distance transform algorithm is performed to obtain binary distances of all of the first-type feature points.

Step S54: Location of a maximum binary distance among all binary distances is taken as center of the tracking object.

In one exemplary example, the method of the second preferred embodiment is applied in hand positioning as detailed below.

First, in a feature binary image, a binary image is transformed into a distance image by executing a distance transform algorithm.

Value of the distance image represents a shortest distance from a point within the object to an edge (e.g., top, bottom, left and right) thereof. Hence, the value of a point proximate the edge is less than that of a point away from the edge.

Hand and, for example face, may overlap in the state of overlap. A maximum distance can be found by executing the distance transform algorithm and it may occur on the face. This is because skin color of the face is similar to that of the hand. Thus, both the face and the hand are taken as image points of interest in binary image processing. Unfortunately, it often finds the incorrect position of the hand.

Step S52 states that binary image values of the second-type feature points are deleted. For example, binary values of the second-type feature points are changed from one to zero so that a binary structure of the face (or any of other non-tracking objects) can be destroyed. Thus, edge data of the face can also be obtained. After the distance transform, the maximum value may represent the hand position rather than the face.

It is possible of obtaining a rectangular area of the hand in the state of overlap by referring to the position of the hand and the distance transform value of the hand. Thus, position of the hand in the state of overlap can be shown. It is assumed that coordinate of the hand center is (x, y), its value is DT, and in one possible design the rectangular area of the hand HR can be expressed as HR=(x−2DT, y−2.72DT, 4DT, 4DT).

The method of the invention can not only determine state of a tracking object and a non-tracking object but also find center of the tracking object when they are overlapped. However, this is employed conversely by searching the corresponding matched points in the image of the current overlapping object for each detected feature point of the separation template image. Here, the separation template image consists of both the tracking object image and the non-tracking object image when they are in the state of proximity. Suppose with the most recent separation template image, $N_C$ is the number of the feature points belonging to the non-tracking object (i.e., the second-type feature points) and $N_O$ is the number of the feature points belonging to the tracking object (i.e., the first-type feature points). When the matching error between a detected feature point in the separation template image and its best matched point in the image of the current overlapping object is small, it denotes the detected feature point in the separation template image also appears in the overlapping object image; otherwise, it is regarded that the detected feature point in the separation template image is disappeared in the overlapping object image.

Figure 6:
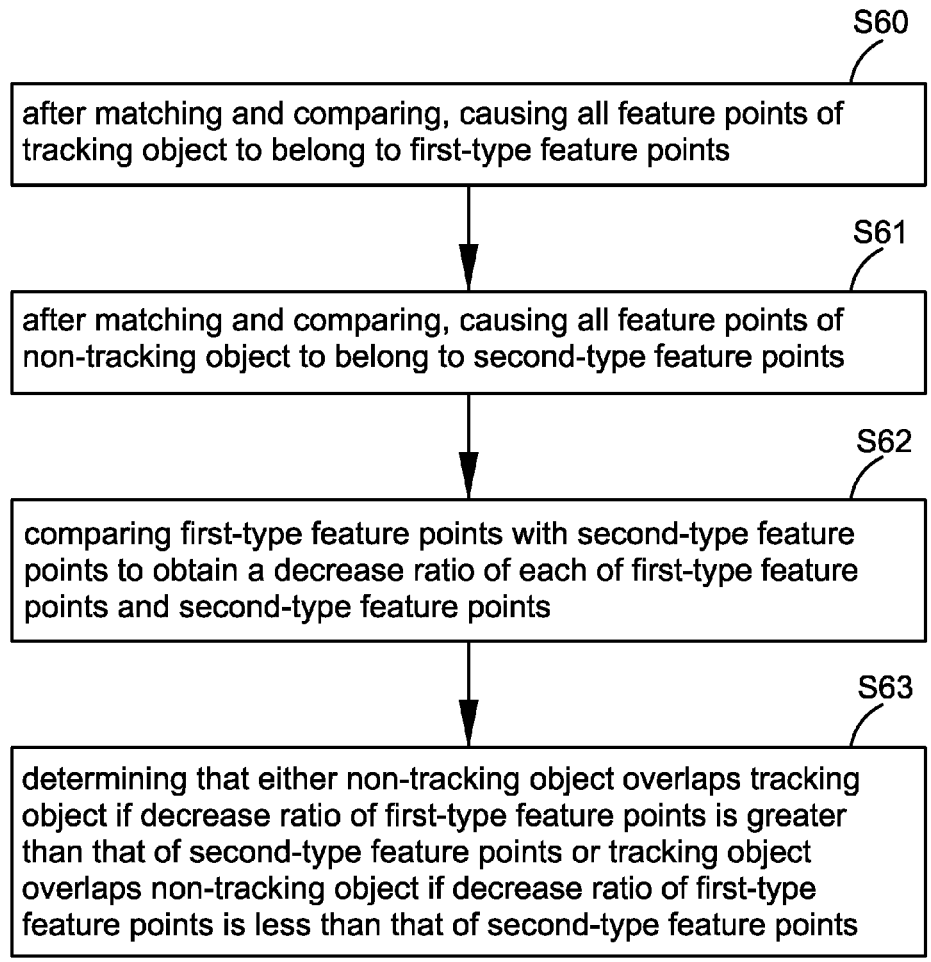
FIG. 6 is a flow chart of a method of object tracking according to a third preferred embodiment of the invention.

Referring to FIG. 6, a flow chart illustrates a method of a third preferred embodiment of the invention. The method of the third preferred embodiment comprises the following steps:

Step S60: After matching and comparing, it is determined that all feature points of the tracking object belong to the first-type feature points.

Step S61: After matching and comparing, it is determined that all feature points of the non-tracking object belong to the second-type feature points.

Step S62: The first-type feature points and the second-type feature points are compared each other to obtain a decrease ratio of each of the first-type feature points and the second-type feature points.

Step S63: It is determined that the non-tracking object overlaps the tracking object if the decrease ratio of the first-type feature points is greater than that of the second-type feature points. Otherwise, it is determined that the tracking object overlaps the non-tracking object. The overlapping relationship of the tracking object and the non-tracking object can be determined based on $K_C$ and $K_O$ in the state of overlap.

The decrease ratio of the first-type feature points in the overlapping rectangular is smaller than that of the second-type feature points as the tracking object is extending over and partly covering the non-tracking object. Thus, it is possible of determining whether the tracking object overlaps the non-tracking object or the non-tracking object overlaps the tracking object. Let $K_O$ and $K_C$ be the number of the first type feature points and the second type feature points appearing in the overlapping object image respectively. Ratio K of $K_C$ and $K_O$ is defined below $$K = \frac{K_o}{K_c}$$

K increases as $K_O$ increases and $K_C$ decreases and it is determined that the tracking object is overlapping the non-tracking object.

To the contrary, the first-type feature points of the overlapping objects gradually disappear due to the gradual overlapping of the tracking object by the non-tracking object. As a result, $K_O$ decreases and $K_C$ increases. Decrease ratio of the first-type feature points is greater than decrease ratio of the second-type feature points. Thus, it is possible of determining whether the non-tracking object overlaps the tracking object. Ratio K thus gradually decreases.

The computer may set a fixed overlap coefficient $T_K$ to be $$\frac{N_o}{N_c} \left( \text{i.e. } T_K = \frac{N_o}{N_c} \right).$$

The state of overlapping of an object can be determined by K. It is determined that the tracking object overlaps the non-tracking object if K is greater than $T_K$. To the contrary, it is determined that the non-tracking object overlaps the tracking object if K is less than $T_K$.

The method of object tracking of the invention can be briefed below. Relative location of the tracking object and the non-tracking object can be determined. Next, at least one separation template image is created when the two objects are proximity each other. Next, the separation template image can be employed as a basis for feature points matching when the two objects overlap. As a result, tracking failure due to overlap can be avoided. Further, object tracking efficiency and effectiveness can be greatly increased.

While the invention has been described in terms of preferred embodiments, those skilled in the art will recognize that the invention can be practiced with modifications within the spirit and scope of the appended claims.

What is claimed is:

1. A method of object tracking comprising the steps of:
   (a) creating areas of a tracking object and a non-tracking object respectively;
   (b) determining a state of the tracking object and the non-tracking object is separation, proximity, or overlap, wherein the step (b) further comprising:
      (b1) creating a first inspection range of the tracking object and a second inspection range of the non-tracking object by executing a predetermined formula based on an area of the tracking object, an area of the non-tracking object, a width, a height, and a coordinate on a left top portion of the area of the tracking object, and a width, a height, and a coordinate on a left top portion of the area of the non-tracking object;
      (b2) determining the state is separation if the first inspection range does not overlap the second inspection range;
      (b3) determining the state is proximity or overlap of the first inspection range overlaps the second inspection range;
      (b4) creating an alert range if the state is determined to be proximity or overlap and calculating an overlapping ratio of the alert range and the first inspection range; and
      (b5) either determining the state is proximity if the overlapping ratio is less than an alert range threshold or determining the state is overlap if the overlapping ratio is greater than the alert range threshold;
   (c) creating at least one separation template image of a separation area of at least one of the tracking object and the non-tracking object when the state of the tracking object and the non-tracking object is proximity;

(d) fetching all feature points of an overlapping area of the tracking object and the non-tracking object when the state of the tracking object and the non-tracking object changes from proximity to overlap;

(e) performing a match on each of the feature points and the at least one separation template image so as to calculate a corresponding matching error score respectively, the corresponding matching error score being a location deviation of each of the feature points between the overlapping area when the state is overlap and the at least one separation template image when the state is proximity;

(f) comparing the matching error score of each of the feature points with a predetermined threshold so as to determine whether the feature point belongs to the tracking object or the non-tracking object;

(g) assigning all feature points that belong to the tracking object as a first-type feature points;

(h) assigning all feature points that belong to the non-tracking object as a second-type feature points;

(i) deleting binary image values of the second-type feature points;

(j) performing a distance transform algorithm to obtain binary distances of all of the first-type feature points; and (k) taking a location of a maximum binary distance among all of the binary distances as the center of the tracking object.

2. The method of claim 1, wherein the at least one separation template image is created from the separation area of the non-tracking object is if the tracking object is proximate the non-tracking object, the feature point belongs to the tracking object if the matching error score of the feature point is greater than the predetermined threshold, and the feature point belongs to the non-tracking object if the matching error score of the feature point is less than the predetermined threshold.

3. The method of claim 1, wherein the at least one separation template image is created from the separation area of the tracking object the tracking object is proximate the non-tracking object, the feature point belongs to the non-tracking object if the matching error score of the feature point is greater than the predetermined threshold, and the feature point belongs to the tracking object if the matching error score of the feature point is less than the predetermined threshold.

4. The method of claim 1, wherein step (a) comprises the sub-steps of:

(a1) creating a corresponding area of each of a plurality of objects in an image wherein the area has a width, a height, and a coordinate on a left top portion all associated with the corresponding object;

(a2) selecting at least one tracking object candidate from the plurality of objects;

(a3) calculating a first area of each tracking object candidate at a first time and a second area of all of the plurality of objects in the separation template image at an immediate second time;

(a4) determining extent of the second area overlapping the first area to obtain an overlapping ratio; and (a5) taking the tracking object candidate having the highest overlapping ratio in the second area as the tracking object.

5. The method of claim 1, wherein the feature points fetch is performed using a local binary pattern (LBP), a scale-invariant feature transform (SIFT), a speeded up Robost features (SURF), or any other vertex detection algorithm.

6. The method of claim 1, further comprising employing sum of squared difference (SSD) to perform a block matching for the feature point matching.

7. The method of claim 1, wherein in response to determining the state of the tracking object and the non-tracking object is overlap, the method further comprising the steps of:

comparing the first-type feature points with the second-type feature points to obtain a decrease ratio of each of the first-type feature points and the second-type feature points; and determining that either the non-tracking object overlaps the tracking object if the decrease ratio of the first-type feature points is greater than that of the second-type feature points or the tracking object overlaps the non-tracking object if the decrease ratio of the first-type feature points is less than that of the second-type feature points.

* * * * *